April 1, 1969   W. H. REVOIR ET AL   3,436,352
ADSORBENT FOR AMMONIA GAS
Filed Aug. 31, 1966
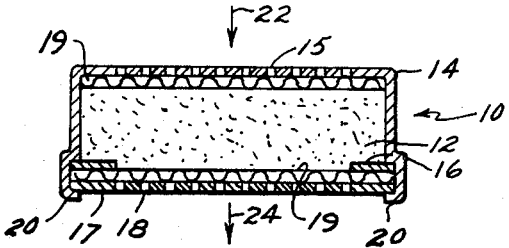
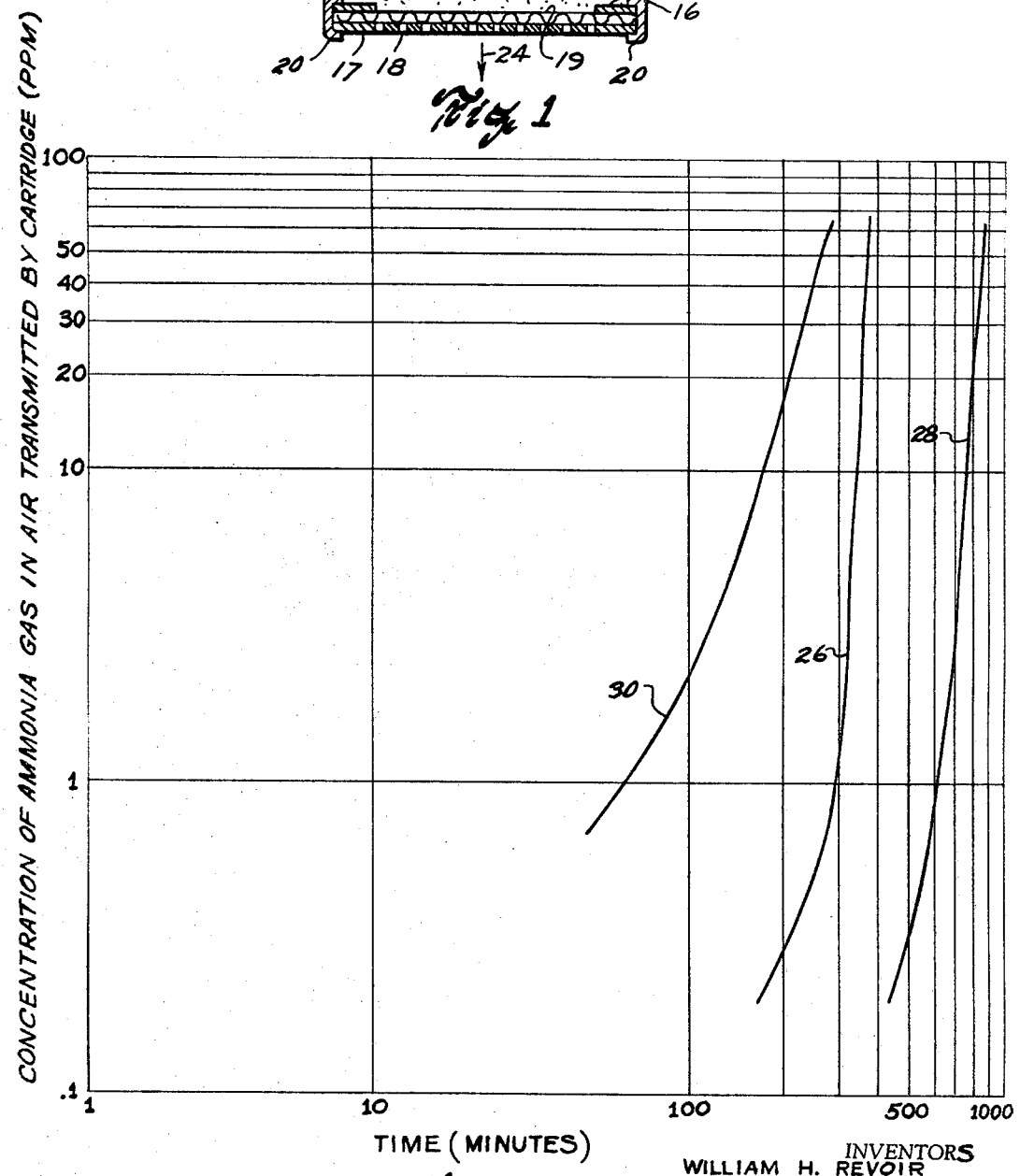
INVENTORS
WILLIAM H. REVOIR
WESLEY M. GARDNER
BY
ATTORNEY United States Patent Office 3,436,352
Patented Apr. 1, 1969

3,436,352
ADSORBENT FOR AMMONIA GAS
William H. Revoir, West Hartford, Conn., and Wesley M. Gardner, Whitinsville, Mass., assignors, by mesne assignments, to American Optical Company, Southbridge, Mass., a corporation of Delaware
Filed Aug. 31, 1966, Ser. No. 576,342
Int. Cl. C09k 3/00
U.S. Cl. 252—193                            4 Claims

ABSTRACT OF THE DISCLOSURE

A material for adsorbing ammonia gas from a stream of air consisting essentially of carbon impregnated with a nickel salt such as nickel.

This invention relates to adsorbent materials for ammonia gas and, more particularly, to ammonia adsorbents for use in respirators.

Adsorbent materials used in respirator cartridges for removing ammonia gas from air should transmit air freely so that the materials do not offer excessive resistance to breathing through the cartridges. The adsorbent materials should also transmit air without heating the air to an excessive extent and without forming undesirable fumes by reaction with ammonia being removed from the air. The adsorbent materials should also be adapted to adsorb a substantial amount of ammonia gas so that respirator cartridges embodying the materials have a reasonably long useful life. Adsorbent materials presently used in respirator cartridges for removing ammonia gas from air are characterized by relatively short useful lives.

It is an object of this invention to provide a novel and improved adsorbent material for ammonia gas; to provide such a material which is especially adapted for use in respirator cartridges; to provide such a material which is adapted to adsorb large amounts of ammonia gas; to provide such a material which can be used in making respirator cartridges having significantly longer useful lives than are presently known in the art; to provide such a material which transmits air freely without offering excessive resistance to breathing through the material; to provide such a material which does not excessively heat air transmitted through the material; and to provide such a material which is adapted to remove ammonia gas from air without forming undesirable fumes by reaction with the ammonia gas.

Briefly described, the novel and improved adsorbent for ammonia gas provided by this invention comprises activated charcoal impregnated with a nickel salt, preferably nickel chloride. The adsorbent material preferably embodies activated charcoal in granular form of a size to be separated between No. 10 and No. 20 wire screen meshes (Tyler series) and embodies more than 16 percent by weight nickel chloride. In an alternate embodiment of this invention, the adsorbent material is adapted to remove ammonia gas and organic vapors from air and comprises an intimate mixture of activated charcoal with activated charcoal impregnated with nickel chloride.

Other objects, advantages and details of the adsorbent materials of this invention appear in the following detailed description of preferred embodiments of the invention, the description referring to the drawing in which:

FIG. 1 is an axial section view through a respirator cartridge embodying the adsorbent material of this invention; and FIG. 2 comprises a graph illustrating properties of the adsorbent materials of this invention.

In accordance with this invention, an improved adsorbent for ammonia gas is made by impregnating carbon, preferably in the form of granular activated coconut shell charcoal, with a nickel salt such as nickel chloride. For example, granular activated charcoal preferably of a size adapted to pass through a Number 10 wire mesh screen but not to pass through a Number 20 wire mesh screen (Tyler series of mesh sizes), is dried for about 16 hours at a temperature of 105° C. An aqueous solution of nickel chloride is then prepared by dissolving 142 grams of nickel chloride hexahydrate ($NiCl_2 \cdot 6H_2O$) in 450 cc. of water. Approximately 200 grams of the dried activated charcoal is then placed in this aqueous solution and is permitted to stand for about 1 hour with occasional stirring. During this period of standing, the charcoal is impregnated with the nickel chloride constituent of the solution so that the solution gradually loses its color. The impregnated charcoal is then removed from the solution, preferably by means of a Buchner funnel with the aid of suction, and is dried for about 16 hours at a temperature of 105° C. Upon weighing the impregnated charcoal, it is determined that approximately 16.7 percent by weight of the impregnated charcoal comprises nickel chloride, most of which is believed to be present in the charcoal in an anhydrous form.

This impregnated charcoal material comprises a superior adsorbent for ammonia gas and is especially adapted for use in respirator cartridges. For example, about 82 cc. of the impregnated charcoal is preferably disposed within a conventional respirator adsorbent cartridge 10 as illustrated at 12 in FIG. 1, the cartridge embodying a cartridge casing 14 which is perforated as at 15, an annular baffle 16, an endplate 17 which is perforated as at 18 and two loosely woven fabric pads 19 or the ilke for retaining the granular charcoal within the cartridge. As illustrated, the casing is turned in at 20 after assembly with the other cartridge members for holding the members in assembled relation. In order to be mounted in a conventional two cartridge respirator of commercially available design, the cartridge 10 is preferably about 2⅞ inches in diameter and has a layer of adsorbent material 12 of about ¾ inch thickness. Such an adsorbent cartridge is adapted to remove a large amount of ammonia gas from air passing through the cartridge. The adsorbent material 12 freely transmits air so that the cartridge is easily used in a respirator and does not excessively restrict breathing through the adsorbent material. For example, a pressure differential equal to only about 0.07 pound per square inch on opposite sides of the adsorbent cartridge is sufficient to transmit 85 liters of air per minute through the cartridge. Reaction of ammonia gas with the adsorbent material does not excessively heat air passing through the material and does not form undesirable fumes. The adsorbent material, and cartridges embodying the adsorbent material, also have much longer useful lives than are provided by ammonia gas adsorbents and cartridges presently in use. For example, when a stream of air containing ammonia gas in concentration of 500 parts per million (p.p.m.) is directed through the adsorbent cartridge 10, as indicated by the arrow 22 in FIG. 1 at a rate of 16 liters per minute, the air being at a temperature of 25° C. and at a relative humidity of 50 percent, the cartridge removes ammonia gas from the air continuously for approximately 380 minutes before the concentration of ammonia gas in air transmitted through the cartridge, indicated at 24 in FIG. 1, becomes as high as 50 p.p.m. As the odor threshold for ammonia gas is considered to be about 51 p.p.m. and the breathing threshold limit (often called the maximum allowable concentration of ammonia gas in air to be breathed) is considered to be 100 p.p.m., this period of 380 minutes can be said to represent the limit of the useful life of the cartridge and its adsorbent material. See curve 26 in FIG. 2.

Where similarly sized adsorbent cartridges are prepared with impregnated activated charcoal embodying 60 percent by weight nickel chloride, the cartridges also transmit air freely without causing excessive resistance to breathing through the cartridges. However, when a stream of air containing 500 p.p.m. ammonia gas is directed through these cartridges in the manner described above, the cartridges remove ammonia gas from the air continuously for about 855 minutes before the concentration of ammonia gas in the transmitted air reaches 50 p.p.m. See curve 28 in FIG. 2. Thus these adsorbent cartridges are far superior to the ammonia gas filter cartridges presently available commercially.

Metal salts impregnated in activated charcoal adsorbents tend to form molecular complex compounds by reaction with ammonia gas in air being transmitted through the adsorbents. It is believed that the number of ammonia gas molecules which combine with each molecule of the metal salt depends in part upon the secondary valence or coordination number of the metal cation employed and in part upon the extent to which the secondary valence is satisfied by the anion of the selected salt. As nickel has a high coordination number or secondary valence which does not appear to be satisfied to any significant extent by the chlorine atom in nickel chloride salt, it is believed that each molecule of nickel chloride in the adsorbent material of this invention is adapted to adsorb six molecules of ammonia gas to form the molecular complex compound hexamine nickel chloride, $Ni(NH_3)_6Cl_2$, thereby providing an adsorbent for ammonia gas superior to any known in the art.

The nickel salt impregnated ammonia gas adsorbent of this invention is also well adapted to be combined in granular form in intimate mixture with activated charcoal which has not been impregnated, thereby to provide an adsorbent for many organic vapors as well as ammonia gas. As will be understood, activated charcoal without impregnants is considered to be an excellent adsorbent for organic vapors. For example 40 cc. of activated charcoal impregnated with 25 percent by weight nickel chloride in the manner above described is intimately mixed with 40 cc., of unimpregnated activated charcoal of the same granular size and is placed in a cartridge of the size described with reference to FIG. 1.

When a stream of air containing 500 p.p.m. of ammonia gas is transmitted through the adsorbent cartridge as above described, the cartridge is found to have a useful life of approximately 270 minutes. See curve 30 in FIG. 2. In addition, when air containing 1000 p.p.m. carbon tetrachloride vapor ($CCl_4$) is transmitted through the adsorbent cartridge at a rate of 16 liters per minute, the air being at a temperature of 25° C. and 50 percent relative humidity, the cartridge removes this organic vapor from the air continuously for about 45 minutes before the concentration of the organic vapor in air transmitted by the cartridge becomes as high as 5 p.p.m., this period being considered to represent the useful life of the adsorbent cartridge with respect to the organic vapor. This combination of impregnated and unimpregnated activated charcoal is also found to have significant use for adsorbing other organic vapors such as ethanolamine, cyclohexylamine, morpholine, pyridine, benzylamine, phenylhydiazine, methylamine, ethylamine, 1,3 propane diamine, and ethylene diamine.

We claim:
1. An adsorbent material for ammonia consisting essentially of activated charcoal impregnated with a quantity of nickel salt, the quantity of said salt being sufficient to react with and remove ammonia from an ammonia-containing gaseous stream, the impregnated charcoal containing up to 60% by weight of said nickel salt.
2. An adsorbent material as set forth in claim 1 wherein said salt comprises nickel chloride.
3. An adsorbent material for ammonia consisting essentially of an intimate mixture of activated charcoal and activated charcoal impregnated with a quantity of nickel salt, the quantity of said salt being sufficient to react with and remove ammonia from an ammonia-containing gaseous stream, the impregnated charcoal containing up to 60% by weight of said nickel salt.
4. The adsorbent material as set forth in claim 3 wherein said nickel salt comprises nickel chloride.

References Cited

UNITED STATES PATENTS

| | | | |
|---|---|---|---|
| 1,947,381 | 2/1934 | Connolly et al. | 252—193 X |
| 2,049,608 | 8/1936 | Forrester | 55—74 X |
| 2,963,441 | 12/1960 | Dolian et al. | 55—74 X |

MAYER WEINBLATT, *Primary Examiner.*

I. GLUCK, *Assistant Examiner.*

U.S. Cl. X.R.

210—502; 55—524, 74, 387; 252—422; 424—131